(12) United States Patent
Joo et al.

(10) Patent No.: US 7,157,824 B2
(45) Date of Patent: Jan. 2, 2007

(54) COIN TYPE VIBRATING MOTOR

(75) Inventors: Young Jun Joo, Kyungki-do (KR); Woo Seok Yang, Kyungki-do (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 0 days.

(21) Appl. No.: 10/947,147

(22) Filed: Sep. 23, 2004

(65) Prior Publication Data

US 2006/0001325 A1 Jan. 5, 2006

(30) Foreign Application Priority Data

Jul. 1, 2004 (KR) ..................... 10-2004-0051000

(51) Int. Cl.
*H02K 7/06* (2006.01)

(52) U.S. Cl. ....................................... 310/81

(58) Field of Classification Search .................. 310/81, 310/268, 90
See application file for complete search history.

(56) References Cited

U.S. PATENT DOCUMENTS

| 6,246,143 B1 * | 6/2001 | Yamaguchi | 310/233 |
| 6,507,136 B1 * | 1/2003 | Yamaguchi | 310/128 |
| 6,828,705 B1 * | 12/2004 | Choi et al. | 310/81 |
| 6,909,206 B1 * | 6/2005 | Koyanagi et al. | 310/43 |

FOREIGN PATENT DOCUMENTS

| JP | 04-12647 | 1/1992 |
| JP | 04-208054 | 7/1992 |
| JP | 09-93859 | 4/1997 |
| JP | 2001-612255 | 3/2001 |
| JP | 2002-349553 | 12/2002 |
| KR | 2001-9713 | 2/2001 |
| KR | 2004-34180 | 4/2004 |

* cited by examiner

*Primary Examiner*—Darren Schuberg
*Assistant Examiner*—Nguyen Hanh
(74) *Attorney, Agent, or Firm*—Lowe Hauptman & Berner, LLP.

(57) ABSTRACT

Disclosed is a coin type vibrating motor including: a rotor provided with an upper base including at least one wound coil placed on the upper surface thereof; a stator including a pair of brushes placed on the upper surface of a lower base, on which a magnet is mounted corresponding to the wound coil; and a shafting unit including a bearing member formed integrally with the upper base to surround the wound coil and the weight, and a shaft, of which the bearing member is installed on the outer periphery, wherein an oil scattering-preventing portion, which exposes an assembling region, and has an inner surface extended downwardly to a designated length while being spaced from the inner surface of the shaft, is formed integrally with the lower surface of an insulator exposed to the outside through an opening of the upper base.

9 Claims, 4 Drawing Sheets

COIN TYPE VIBRATING MOTOR

RELATED APPLICATIONS

The present application is based on, and claims priority from, Korean Application Serial Number. 2004-51000, filed Jul. 1, 2004, the disclosure of which is hereby incorporated by reference herein in its entirety.

BACKGROUND OF THE INVENTION

1. Field of the Invention

The present invention relates to a coin type vibrating motor, and more particularly to a coin type vibrating motor, which prevents oil, emitted from an oilless metal bearing provided on a shaft, from being scattered toward contact regions between a commutator and brushes, when the motor is driven, to prevent electrical short, reduces the number of required components to reduce production costs, and improves assembling efficiency.

2. Description of the Related Art

Generally, sound and vibration are mainly used by communication devices to inform users of an incoming call. In order to generate the vibration, a small-sized vibrating motor is driven so that the driving force of the vibrating motor is transmitted to a housing of a device, thereby vibrating the whole portions of the device.

Vibrating motors applied to the communication devices, such as a portable communication terminal, are divided into a flat type vibrating motor (also, referred to as a coin type vibrating motor) and a cylindrical type vibrating motor (also, referred to as a bar type vibrating motor).

The coin type vibrating motor generates vibration through a simple structure in which a weight having a high specific gravity is disposed and rotated, and is manufactured in a thin thickness, thereby facilitating the miniaturization of portable terminals. Thus, the coin type vibrating motor has been widely used.

FIG. 1 is an exploded perspective view of a conventional coin type vibrating motor, and FIG. 2 is a longitudinal-sectional view of the conventional coin type vibrating motor. As shown in FIGS. 1 and 2, the conventional coin type vibrating motor 1 comprises a rotor assembly 10 (hereinafter, referred to as a "rotor") serving as a rotary member, a stator assembly 20 (hereinafter, referred to as a "stator") serving as a stationary member, and a housing 30 for accommodating the rotor 10 and the stator 20.

That is, the rotor 10 is rotatably installed in the housing 30, and includes an upper base 11 provided with wound coils 12, a weight 13 eccentrically disposed adjacent to the wound coils 12, and an insulator 14 for protecting the upper base 11 and the weight 13 from the external environment. A commutator 15, including a plurality of segments divided and spaced from each other by designated intervals in a circumferential direction, is placed on the lower surface of the upper base 11, and a lower surface of the commutator 15 is exposed to the outside. The segments of the commutator 15 elastically contact upper ends of a pair of brushes 25, of which lower ends are fixed to the stator 20.

The stator 20 is placed on a bracket 35 closing the opened lower surface of housing 30, and includes a lower base 21 mounted on the bracket 35, a ring-shaped magnet 22 mounted on the upper surface of the lower base 21 and provided with N and S poles alternately arranged in a circumferential direction, and a power supply unit 23 electrically connected to a lead wire (not shown) for supplying external power and placed on one side of the upper surface of the lower base 21.

The lower ends of a pair of the brushes 25, of which upper ends are elastically supported by the commutator 15 of the rotor 10, are electrically connected to a positive terminal 23a and a negative terminal 23b of the power supply unit 23 so that different polar currents, i.e., anode (+) and cathode (−) are respectively supplied to the positive and negative terminals 23a and 23b.

The rotor 10 is rotatably assembled with the central area of the upper surface of the bracket 35 by means of a bearing member 32 of a shaft 31 vertically placed on the central area of the upper surface of the bracket 35. Here, the bearing member 32 is embedded by the insulator 14 of the rotor 10, and upper and lower ends of the shaft 31 are respectively supported by upper and lower shaft supporters 31a and 31b provided on the upper surface of the bracket 35 and the lower surface of the housing 30. Further, upper and lower washers 34a and 34b are respectively placed on the upper and lower shaft supporters 31a and 31b.

When external power is applied to the above-described coin type vibrating motor 1, different polar currents are induced to a pair of the brushes 25. Such currents supply power to the wound coils 12 of the rotor 10 along a circuit pattern of the upper base 11 through the commutator 15 contacting the upper ends of a pair of the brushes 25.

The rotor 10 is rotated in one direction centering on the shaft 31 by interaction between an electric field generated in the flow of the current induced in the wound coils 12 and a magnetic field generated by the magnet 22 of the stator 20.

Whenever the rotor 10 is rotated, contact points between the brushes 25 and the segments of the commutator 15 contacting the brushes 25 are changed so that the polarity of the power continuously varies. In this case, the rotor 10 having the eccentric center of gravity is continuously rotated, thereby inducing vibration serving as an incoming call signal.

An oilless metal bearing, which does not require a lubricating oil, is used as the bearing member 32 placed on the outer periphery of the shaft 31 for reducing the friction between the shaft 31 and the rotor 30. When such an oilless metal bearing is manufactured by sintering, the oilless metal bearing is impregnated with oil of a designated amount.

When the above-described vibrating motor 1 is rotated, the bearing member 32 of the rotor 10 rotated at a high speed in one direction emits and scatters the oil contained therein to the outside by centrifugal force. The scattered oil contaminates a pattern circuit printed on the lower surface of the upper base 11 and the upper surface of the lower base 21.

Fine metal powders are produced due to the mechanical friction between the commutator 15 and the brushes 25 made of a metal. In case that the oil emitted from the bearing member 32 is scattered to the contact points between the commutator 15 and the brushes 25, the scattered oil and the fine metal powders are burnt by electric sparks generated by friction and produce foreign substances such as black powders, and the foreign substances are not emitted to the outside but remain in the housing 30.

In case that nonconductive substances of the foreign substances are caught in the contact points between the commutator 15 and the brushes 25, the nonconductive substances generate a section, which is not electrically connected. On the other hand, in case that conductive substances of the foreign substances are caught in gaps between the segments of the commutator 15, there the conductive substances generate electrical short, thereby reducing the lifespan, performance and reliability of the vibrating motor 1.

The lower washer 34b is placed on the shaft 31 for preventing the contact between the upper base 11 of the rotor 10 and the magnet 22 of the stator 20. During the assembling process of the vibrating motor 1, the inaccurate assembly of the lower washer 34b, which is mounted on the lower shaft supporter 31b, with the lower part of the shaft 31 causes failures of finished products and reduces assembling efficiency of the vibrating motor 1.

SUMMARY OF THE INVENTION

Therefore, the present invention has been made in view of the above problems, and it is an object of the present invention to provide a coin type vibrating motor, which prevents oil, emitted from a bearing member by centrifugal force, from being scattered toward contact regions between a commutator and brushes when the motor is driven, thereby preventing the generation of electrical short of a circuit, reducing required components to improve assembling efficiency, and reducing production costs.

In accordance with the present invention, the above and other objects can be accomplished by the provision of a coin type vibrating motor comprising: a rotor provided with an upper base including at least one wound coil placed on the upper surface thereof, a weight eccentrically disposed on the upper surface thereof, and a commutator placed on the lower surface thereof; a stator including a pair of brushes placed on the upper surface of a lower base, on which a magnet is mounted corresponding to the wound coil, said brushes provided with upper ends contacting the commutator, and a power supply unit for supplying power to the brushes; and a shafting unit including a bearing member formed integrally with the upper base to surround the wound coil and the weight, and a shaft, of which the bearing member is installed on the outer periphery, wherein an oil scattering-preventing portion, which exposes an assembling region between the outer surface of the shaft and the inner surface of the bearing member to the outside therethrough, and has an inner surface extended downwardly to a designated length while being spaced from the inner surface of the shaft, is formed integrally with the lower surface of an insulator exposed to the outside through an opening of the upper base.

Preferably, the oil scattering-preventing portion may be extended to have a designated length such that the rotor does not interfere with the stator when the lower end of the shaft contacts the upper end of a lower shaft supporter.

Further, preferably, the oil scattering-preventing portion may have a hollow cylindrical structure such that the inner diameter thereof is constant.

Moreover, preferably, the oil scattering-preventing portion may have an inclined inner surface such that the inner diameter of the lower part thereof gradually widens to be larger than that of the upper part thereof.

More preferably, the inclined inner surface may have a gradient such that the rotor does not interfere with the stator when the lower end of the shaft contacts the upper end of the lower shaft supporter.

Preferably, the oil scattering-preventing portion may have an inner stepped part extended downwardly to surround the lower shaft supporter supporting the lower end of the shaft and provided with an inner surface mounted on the upper end of the lower shaft supporter.

More preferably, the inner stepped part may be formed at a designated position of the oil scattering-preventing portion such that the rotor does not interfere with the stator when the lower end of the shaft contacts the upper end of the lower shaft supporter.

Preferably, the coin type vibrating motor may further comprise a housing provided with an upper shaft supporter, for supporting the upper end of the shaft, formed on the central portion of the lower surface thereof; and a bracket provided with a lower shaft supporter, for supporting the lower end of the shaft, formed on the central portion of the upper surface thereof.

More preferably, an upper washer, for maintaining the interval between the lower surface of the housing and the upper surface of the rotor, may be formed on the upper shaft supporter.

Preferably, a protrusion may be formed on the external surface of the bearing member so that the bearing member is caught by the insulator through the protrusion.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the annexed drawings.

Figure 1:
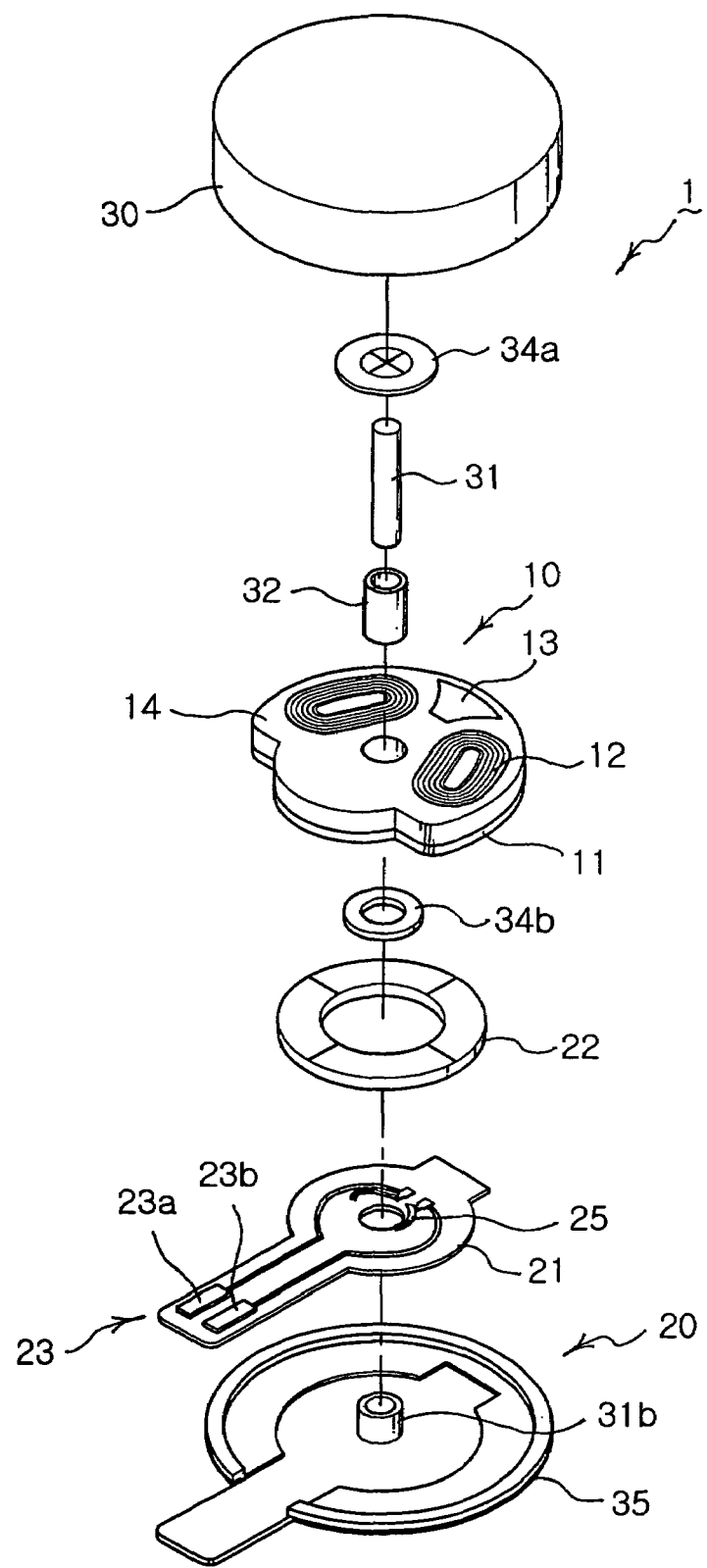
FIG. 1 is an exploded perspective view of a conventional coin type vibrating motor.
Figure 2:
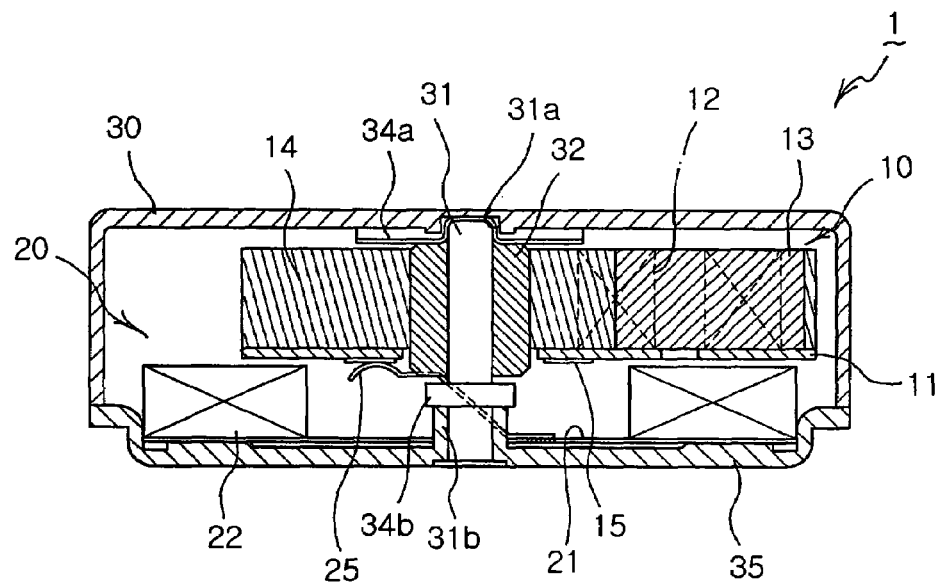
FIG. 2 is a longitudinal-sectional view of the conventional coin type vibrating motor.
Figure 3:
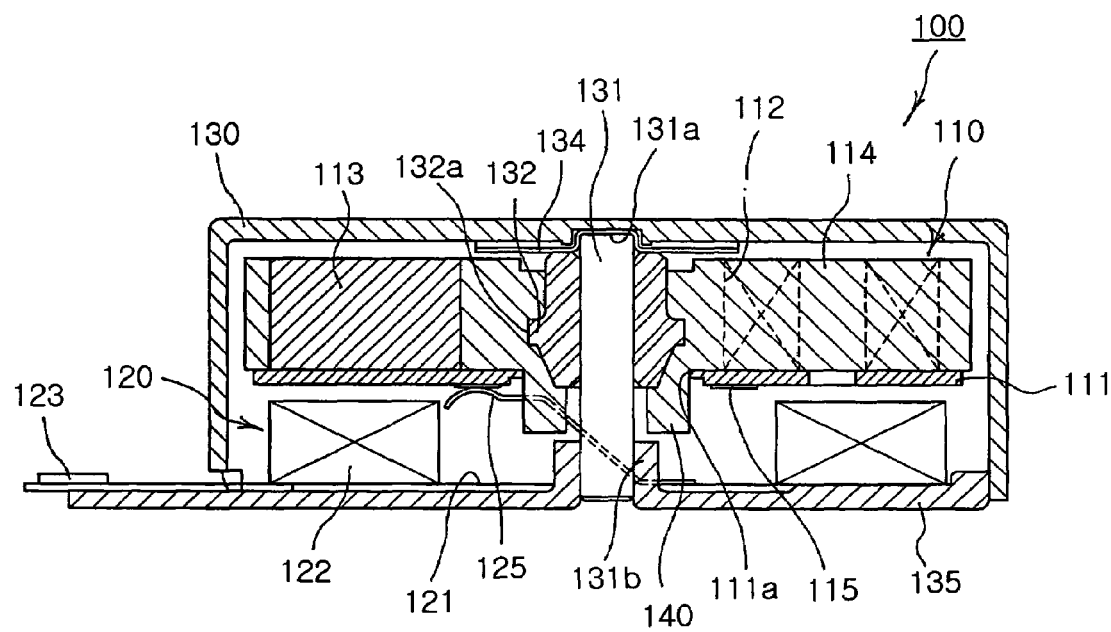
FIG. 3 is a longitudinal-sectional view of a coin type vibrating motor in accordance with one embodiment of the present invention.
Figure 4:
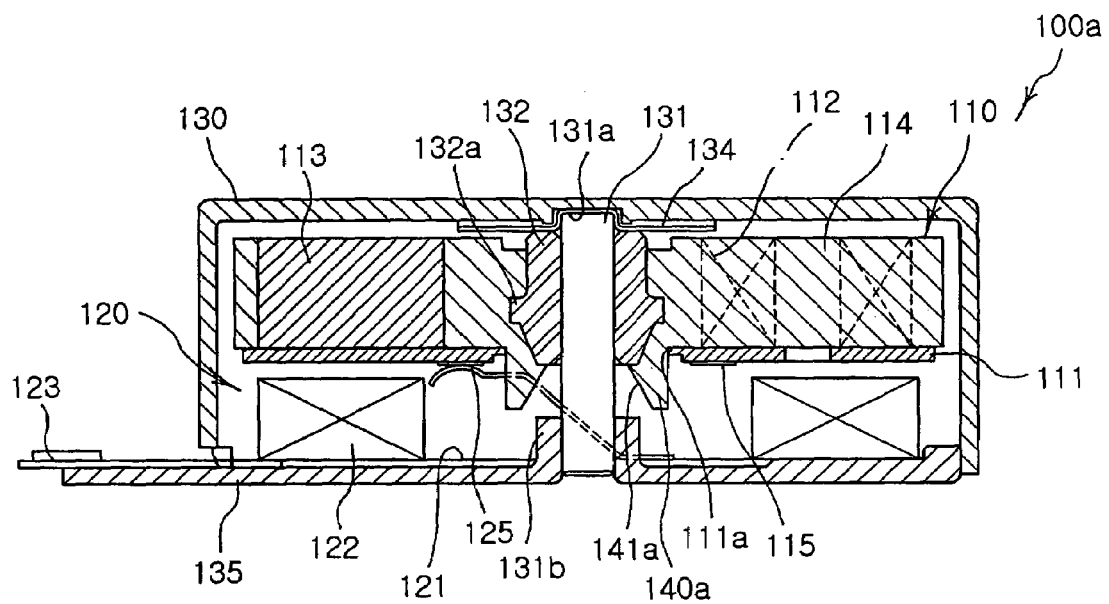
FIG. 4 is a longitudinal-sectional view of a coin type vibrating motor in accordance with yet another embodiment of the present invention.

FIG. 3 is a longitudinal-sectional view of a coin type vibrating motor in accordance with one embodiment of the present invention, and FIG. 4 is a perspective view of a rotor employed by the coin type vibrating motor of the present invention.

As shown in FIGS. 3 and 4, the coin type vibrating motor 100 in accordance with one embodiment of the present invention prevents oil, with which a bearing member 132 is impregnated, from being emitted and scattered toward contact regions between a commutator 115 and brushes 125 and a rotor 110 and a stator 120 from unnecessarily contacting each other, and comprises the rotor 110, the stator 120, a shafting unit 130, and an oil scattering-preventing portion 140.

That is, the rotor 110 is an eccentric rotary structure, which is eccentrically rotated centering on a shaft 131, and includes an upper base 111, at least one wound coil 112, a weight 113, an insulator 114, and the commutator 115.

At least one wound coil 112 is formed on the upper surface of the upper base 111, on which a pattern circuit is not formed, and the weight 113 made of a material having a high specific gravity, such as tungsten, is eccentrically placed adjacent to the wound coil 112.

The commutator 115, including a plurality of segments divided and spaced from each other by designated intervals in a circumferential direction, is placed on the lower surface of the upper base 111, on which a pattern circuit is not formed, and a lower surface of the commutator 115 is exposed to the outside. The commutator 115 is made of a metal material, such as gold, silver, etc., and is manufactured by printing a pattern on the lower surface of the upper base 111 or plating the lower surface of the upper base 111 with the metal material.

The wound coil 112 and the weight 113 are molded by the insulator 114 obtained by injection molding so that the wound coil 112 and the weight 113 are protected from the external environment, and the upper base 111 is formed integrally with the insulator 114 when the insulator 114 is manufactured by injection molding.

Thereby, since the center of gravity of the rotor 110 is eccentric toward one side by the eccentrically disposed weight 113, the rotor 110 during rotation generates vibration.

The stator 120 is a stationary structure placed on the bracket 135 closing the opened lower surface of the housing 130, and includes a lower base 121, a magnet 122, a power supply unit 123, and the brushes 125.

The magnet 122 corresponding to the wound coil 112 is mounted on the upper surface of the lower base 121, and is a ring-shaped permanent magnet provided with N and S poles alternately arranged in a circumferential direction. Here, the number of N and S poles of the magnet 12 is 2n, i.e., 2, 4, 6, . . . .

Since components of the vibrating motor 100 increase based on the number of the N and S poles of the magnet 122, it is preferable that the number of the N and S poles of the magnet 122 is approximately 2 to 6 to reduce the number of the components of the vibrating motor 100.

A pair of the brushes 125, of which upper ends elastically contact and are electrically connected to the commutator 115 placed on the lower surface of the upper base 111, are installed on the upper surface of the lower base 121, and are electrically connected to the power supply unit 123 including positive and negative terminals, in which different polar currents, i.e., anode (+) and cathode (−), respectively flow, so as to supply different polar currents to the segments of the commutator 115.

Here, the brushes 125 and the power supply unit 123 are electrically connected through a conductive pattern line (not shown) printed on the upper surface of the lower base 121.

The rotor 110 and the stator 120 are contained by an internal space formed between the housing 130 provided with the opened lower surface and the bracket 135 assembled therewith, and the rotor 110 is supported by the shafting unit 130 including a shaft 131 and the bearing member 132 so that the rotor 110 is rotated against the stator 120.

The upper end of the shaft 131 is supported by an upper shaft supporter 131a depressed into the central area of the lower surface of the housing 130, and the lower end of the shaft 130 is supported by a lower shaft supporter 131b protruded from the central area of the upper surface of the bracket 135. An upper washer 134, for preventing the direct friction between the bearing member 132 and the housing and the contact between the housing 130 and the rotor 110, is installed on the upper shaft supporter 131a.

The bearing member 132, which is installed on the middle area the outer periphery of the shaft 131, is an oilless metal bearing impregnated with oil at a content of 12% when the oilless metal bearing is manufactured by sintering, thereby reducing friction between the bearing member 132 and the rotor 110.

The bearing member 132 is embedded by the insulator 114 formed integrally with the upper base 111 by injection molding for protecting the wound coil 112 and the weight 113 from the external environment, and a protrusion 132a is formed on the external surface of the bearing member 132 so that the bearing member 132 is caught by the insulator 114 through the protrusion 132a after injection molding.

When the insulator 114 for fixing the bearing member 132 is manufactured by injection molding, the bearing member 132 is heated to a high temperature so that the impregnating oil of the bearing member 132 is vaporized. Accordingly, the bearing member 132 is impregnated with the oil at a designated content so that the bearing member 132 after injection molding of the insulator 114 has an oil impregnation ratio of 12% or more.

As shown in FIG. 4, the oil scattering-preventing portion 140 protruded from an opening 111a formed through the central region of the upper base 111 serves to prevent the oil, emitted from the bearing member 132 by centrifugal force of the rotor 110 generated by the driving of the vibrating motor 100, from being scattered toward contact regions between the commutator 115 and the brushes 125.

The oil scattering-preventing portion 140 is formed integrally with the lower surface of the insulator 114 exposed from the opening 11a by injection molding. Contact surfaces between the outer surface of the shaft 131 and the inner surface of the bearing member 132 are exposed to the outside through the oil scattering-preventing portion 140, and the inner surface of the oil-scattering-preventing portion 140 is separated from the outer surface of the shaft 131 and extended downwardly by a designated length.

In this case, the oil emitted from the bearing member 132 is not scattered in a spiral direction but rather is intercepted by the oil scattering-preventing portion 140, and the intercepted oil drops down by its own weight through a space formed between the inner surface of the oil scattering-preventing portion 140 and the outer surface of the shaft 131.

The oil scattering-preventing portion 140 has a length such that the rotor 110 does not contact the stator 120 during the operation of the vibrating motor 100 when the lower end of the shaft 131 contacts the lower shaft supporter 131b.

Thereby, even though the rotor 110, which has been elastically supported by the elastic force of the brushes 125 so as to maintain the distance between the rotor 110 and stator 120, is forced to excessively descend by the elastic force of the brushes 125, it is possible to prevent the interference between the upper base 111 of the rotor 110 and the magnet 122 of the stator 120 and to ensure the stable driving of the vibrating motor 100.

As shown in FIGS. 3 and 4, the oil scattering-preventing portion 140 has a hollow cylindrical structure such that the oil scattering-preventing portion 140 surrounds the shaft 131 while maintaining a designated interval from the shaft 131 in a circumferential direction, thereby guiding the oil emitted from the bearing member 132 just downwardly.

Figure 5:
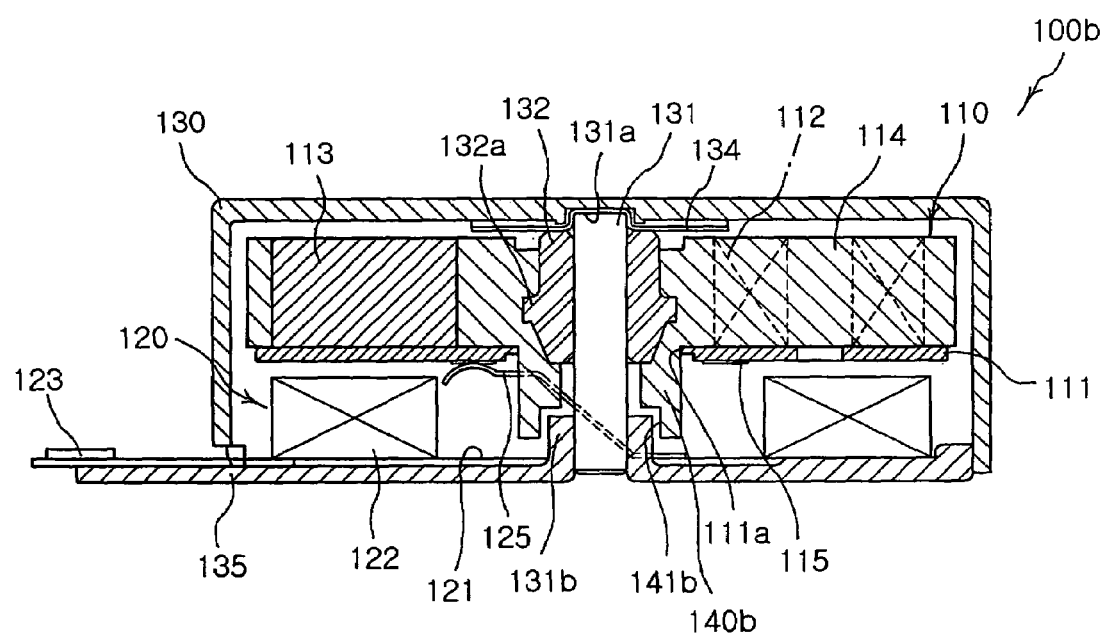
FIG. 5 is a longitudinal-sectional view of a coin type vibrating motor in accordance with another embodiment of the present invention.

FIG. 5 is a longitudinal-sectional view of a coin type vibrating motor in accordance with another embodiment of the present invention. As shown in FIG. 5, an oil scattering-preventing portion 140a has an inclined inner surface 141a such that the inner diameter of the lower part gradually widens to be larger than the inner diameter of the upper part.

In this case, when the rotor 110 is rotated, oil emitted from the bearing member 132 is not scattered toward contact regions between the commutator 115 and the brushes 125, but rather is guided downwardly along the inclined inner surface 141*a* and drops to the upper surface of the bracket 135.

Preferably, the inclined inner surface 141*a* of the oil scattering-preventing portion 140*a* has a designated gradient such that the rotor 110 elastically supported by the brushes 125 contacts the upper end of the lower shaft supporter 131*b* supporting the lower end of the shaft 131 when the rotor 110 excessively descends, thereby preventing the interference between the rotor 110 and the stator 120.

Figure 6:
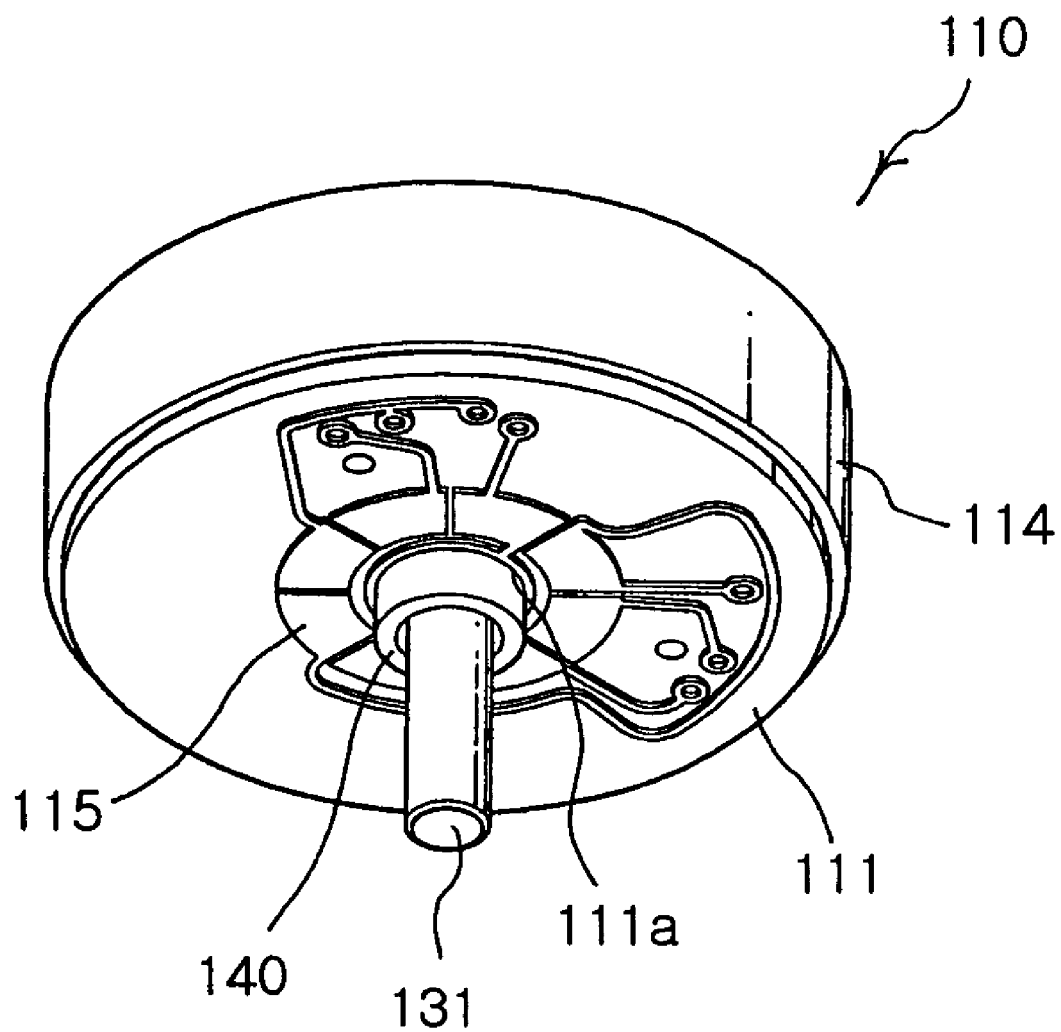
FIG. 6 is a perspective view of a rotor employed by the coin type vibrating motor in accordance with an embodiment of the present invention.

FIG. 6 is a longitudinal-sectional view of a coin type vibrating motor in accordance with yet another embodiment of the present invention. An oil scattering-preventing portion 140*b* is downwardly extended to a designated length so as to surround the lower shaft supporter 131*b* supporting the lower end of the shaft 131, and inner stepped part 141*b* placed on the upper end of the lower shaft supporter 131*b* is formed in the inner surface of the oil scattering-preventing portion 140*b*.

In this case, when the rotor 110 is rotated, oil emitted from the bearing member 132 is not scattered toward contact regions between the commutator 115 and the brushes 125, but rather is guided downwardly along the inner surface of the oil scattering-preventing portion 140*b* provided with the inner stepped part 141*b*, and drops to the lower shaft supporter 131*b*.

Preferably, the inner stepped part 141*b* is formed on a designated position of the inner surface of the oil scattering-preventing portion 140*b* such that the rotor 110 elastically supported by the brushes 125 contacts the upper end of the lower shaft supporter 131*b* supporting the lower end of the shaft 131 when the rotor 110 excessively descends, thereby preventing the interference between the rotor 110 and the stator 120.

The generation of vibration, serving to inform users of an incoming call, by the above-described vibrating motor 100 will be described in detail.

Since the upper ends of a pair of the positive and negative brushes 125 elastically support the rotor 110 so as to maintain the gap between the rotor 110 and the stator 120 and elastically contact the commutator 115 placed on the lower surface of the upper base 111, when external power is supplied to a pair of the positive and negative brushes 125 through the power supply unit 123, current is supplied alternately to the wound coil 112 connected to the commutator 115 by the electrical contact between the divided segments of the commutator 115 and a pair of the positive and negative brushes 125.

In this case, the rotor 110 is rotated in one direction centering on the shaft 131 by the interaction the electrical field generated from the wound coil 112 of the rotor 110 and the magnetic field generated from the magnet 122 of the stator 120.

Here, since the weight 113 having a high specific gravity is eccentrically placed on the rotor 110, lateral pressure generated from the shaft 131 is transmitted to the housing 130 accommodating the rotor 110 and the vibrating motor 100 and the overall portions of a device employing the vibrating motor 100, thereby generating vibration for informing a user of an incoming call.

Impregnating oil is emitted from the bearing member 132, installed on the outer periphery of the shaft 131, by centrifugal force generated due to the rotation of the rotor 110.

Here, the oil scattering-preventing portion 140, 140*a* or 140*b* downwardly extended to a designated length is formed on the lower surface of the rotor 110 so that the extended part is spaced from the outer surface of the shaft 131. The oil emitted from the bearing member 132 is not scattered toward the contact portions between the commutator 130 and the brushes 125 by centrifugal force, collides with the inner surface of the oil scattering-preventing portion 140 and 140*a* or 140*b*. Thereby, it is possible to prevent the oil from being scattered in a spiral direction.

Accordingly, in case that the oil scattering-preventing portion 140 has a hollow cylindrical structure with a constant inner diameter as shown in FIG. 3, the oil, which is not scattered toward the contact portions between the commutator 115 and the brushes 125, drops to the lower shaft supporter 131*b* supporting the lower end of the shaft 131 by its own weight.

Further, in case that the oil scattering-preventing portion 140*a* has the inclined inner surface 141*a* having a designated gradient as shown in FIG. 5, the oil, which is not scattered toward the contact portions between the commutator 115 and the brushes 125, flows down along the inclined inner surface 141*a* and drops to the upper surface of the bracket 135.

Moreover, in case that the oil scattering-preventing portion 140*b* has the inner stepped portion 140*b* as shown in FIG. 6, the oil, which is not scattered toward the contact portions between the commutator 115 and the brushes 125, drops to the lower shaft supporter 131*b* supporting the lower end of the shaft 131 by its own weight.

Although the rotor 110 elastically supported by the elasticity of the brushes 125 is forced to excessively descend by a sudden external force, the oil scattering-preventing portion 140, 140*a*, or 140*b* contacts the lower shaft supporter 131*b* before the rotor 110 contacts the stator 120, thereby preventing the interference between the rotor 110 and the stator 120. Accordingly, the oil scattering-preventing portion 140, 140*a*, or 140*b* ensures the stable operation of the vibrating motor and prevents the components of the vibrating motor from being damaged.

As apparent from the above description, the present invention provides a coin type vibrating motor, in which an oil scattering-preventing portion, having a hollow structure, provided with a downwardly-extended inner surface spaced from the outer surface of a shaft is formed on the lower surface of a rotor, thereby preventing oil, emitted from a bearing member, from being scattered in a spiral direction by centrifugal force when the motor is driven. Thus, the coin type vibrating motor of the present invention prevents the oil from being burnt by electrical sparks generated from contact regions between a commutator and brushes, thereby reducing the production of foreign substances, such as black powders, reducing electrical short of the motor and the generation of electrically disconnected section, and being stably driven.

Further, since the oil scattering-preventing portion serves as a conventional lower washer, which prevents the interference between a rotor and a stator, the coin type vibrating motor of the present invention reduces the number of the required components to reduce the production costs, and simplifies the assembling process to improve assembling efficiency.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A coin type vibrating motor comprising:
a rotor provided with an upper base including at least one wound coil placed on the upper surface thereof, a weight eccentrically disposed on the upper surface thereof, and a commutator placed on the lower surface thereof;
a stator including a pair of brushes placed on the upper surface of a lower base, on which a magnet is mounted corresponding to the wound coil, said brushes provided with upper ends contacting the commutator, and a power supply unit for supplying power to the brushes; and
a shafting unit including a bearing member formed integrally with the upper base to surround the wound coil and the weight, and a shaft, of which the bearing member is installed on the outer periphery,
wherein an oil scattering-preventing portion, which exposes an assembling region between an outer surface of the shaft and an inner surface of the bearing member to the outside therethrough, and has an inner surface extended downwardly to a designated length while being spaced from the outer surface of the shaft, is formed integrally with the lower surface of an insulator exposed to the outside through an opening of the upper base, and
wherein the oil scattering-preventing portion is extended to have a designated length such that the rotor does not interfere with the stator when the lower end of oil scattering-preventing portion contacts an upper end of a lower shaft supporter for supporting a lower end of the shaft.

2. The coin type vibrating motor as set forth in claim 1, wherein the oil scattering-preventing portion has a hollow cylindrical structure such that the inner diameter thereof is constant.

3. The coin type vibrating motor as set forth in claim 1, wherein the oil scattering-preventing portion has an inclined inner surface such that the inner diameter of the lower part thereof gradually widens to be larger than that of the upper part thereof.

4. The coin type vibrating motor as set forth in claim 3, wherein the inclined inner surface has a gradient such that the rotor does not interfere with the stator when the lower end of the shaft contacts the upper end of the lower shaft supporter for supporting the lower end of the shaft.

5. The coin type vibrating motor as set forth in claim 1, wherein the oil scattering-preventing portion has an inner stepped part extended downwardly to surround the lower shaft supporter for supporting the lower end of the shaft and provided with an inner surface mounted on the upper end of the lower shaft supporter.

6. The coin type vibrating motor as set forth in claim 5, wherein the inner stepped part is formed at a designated position of the oil scattering-preventing portion such that the rotor does not interfere with the stator when the lower end of the shaft contacts the upper end of the lower shaft supporter for supporting the lower end of the shaft.

7. The coin type vibrating motor as set forth in claim 1, further comprising:
a housing provided with an upper shaft supporter, for supporting the upper end of the shaft, formed on the central portion of the lower surface thereof; and
a bracket provided with a lower shaft supporter, for supporting the lower end of the shaft, formed on the central portion of the upper surface thereof.

8. The coin type vibrating motor as set forth in claim 7, wherein an upper washer, for maintaining the interval between the lower surface of the housing and the upper surface of the rotor, is formed on the upper shaft supporter.

9. The coin type vibrating motor as set forth in claim 1, wherein a protrusion is formed on the external surface of the bearing member so that the bearing member is caught by the insulator through the protrusion.

* * * * *